(12) United States Patent
Vaishampayan et al.

(10) Patent No.: US 9,436,628 B2
(45) Date of Patent: Sep. 6, 2016

(54) THERMAL MITIGATION USING SELECTIVE I/O THROTTLING

(71) Applicant: Apple Inc., Cupertino, CA (US)

(72) Inventors: Umesh Suresh Vaishampayan, Santa Clara, CA (US); Derek R. Kumar, Cupertino, CA (US); Christopher John Sarcone, Saratoga, CA (US); Russell Alexader Blaine, San Francisco, CA (US); Tejas Arun Bahulkar, Sunnyvale, CA (US); Shachar Katz, Herut (IL); Joseph Sokol, Jr., San Jose, CA (US); Matthew John Byom, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/503,312

(22) Filed: Sep. 30, 2014

(65) Prior Publication Data

US 2015/0347330 A1  Dec. 3, 2015

Related U.S. Application Data

(60) Provisional application No. 62/006,006, filed on May 30, 2014.

(51) Int. Cl.
*G06F 5/00* (2006.01)
*G06F 13/26* (2006.01)
*G06F 13/10* (2006.01)
*G05D 23/19* (2006.01)
*G06F 1/20* (2006.01)

(52) U.S. Cl.
CPC ........... *G06F 13/26* (2013.01); *G05D 23/1917* (2013.01); *G06F 1/206* (2013.01); *G06F 13/102* (2013.01)

(58) Field of Classification Search
CPC ..... G06F 1/206; G06F 13/26; Y02B 60/1275
USPC .......................................................... 710/60
See application file for complete search history.

(56) References Cited

U.S. PATENT DOCUMENTS

| | | |
|---|---|---|
| 7,574,321 B2 | 8/2009 | Kernahan et al. |
| 7,793,291 B2 | 9/2010 | Arai et al. |
| 8,224,639 B2 | 7/2012 | Inoue |

(Continued)

OTHER PUBLICATIONS

PCT International Search Report and Written Opinion for PCT International Appln No. PCT/US2015/030886 mailed Jul. 11, 2015. (11 pages).

*Primary Examiner* — Ernest Unelus
(74) *Attorney, Agent, or Firm* — Blakely, Sokoloff, Taylor & Zafman LLP

(57) ABSTRACT

A method and apparatus of a device that manages a thermal profile of a device by selectively throttling input/output operations of the device is described. In an exemplary embodiment, the device monitors the thermal profile of the device, where the device executes a plurality of processes that utilize storage of the device. In addition, the plurality of processes include a high priority process and a low priority process. If the thermal profile of the device exceeds a thermal threshold, the device decreases a first bandwidth range for the low priority process and maintains a second bandwidth range for the high priority process. The device further processes a storage request of the low priority process using the first bandwidth range and processing a storage request of the high priority process using the second bandwidth range.

15 Claims, 9 Drawing Sheets

300

| PRIORITY 302 | % LIMIT | | |
|---|---|---|---|
| | NO I/O THROT 304A | SOME I/O THROT 304B | MORE I/O THROT 304C |
| 0 | 0 - 100 | 0 - 100 | 0 - 90 |
| 1 | 0 - 100 | 0 - 100 | 0 - 80 |
| 2 | 0 - 100 | 0 - 80 | 0 - 50 |
| . | . | . | . |
| N | 0 - 100 | 0 - 50 | 0 - 25 |

(56) References Cited

U.S. PATENT DOCUMENTS 8,374,730 B2 2/2013 Conroy et al.
2003/0191889 A1 10/2003 Forrer, Jr.
2006/0242447 A1 10/2006 Radhakrishnan et al.
2012/0066439 A1 3/2012 Fillingim
2012/0331207 A1 12/2012 Lassa et al.
2013/0138901 A1 5/2013 Cordero et al.

THERMAL BANDS 200A
NO I/O
THROTTLING

THERMAL BANDS 200B
SOME I/O
THROTTLING FOR LOW
PRIORITY PROCESSES

THERMAL BANDS 200C
GREATER I/O
THROTTLING

1

THERMAL MITIGATION USING SELECTIVE I/O THROTTLING

RELATED APPLICATIONS

Applicant claims the benefit of priority of prior, co-pending provisional application Ser. No. 62/006,006 filed May 30, 2014, the entirety of which is incorporated by reference.

FIELD OF INVENTION

This invention relates generally to device thermal management and more particularly to managing a device thermal profile by selective throttling of the device input/output.

BACKGROUND OF THE INVENTION

A device can typically include storage that is used to store data used by the device. The storage can be a hard disk drive (HDD), solid-state device (SDD), flash, and/or another type of storage used by the device. The device further uses different types of input/output (I/O) operations to store, access, and/or manipulate the data stored or to be stored on the storage (e.g., write, read, query, create, and/or delete operations).

Each of these I/O operations will cause the device to consume power that leads to heat being generated by the device. This generated heat can add to the to a thermal load being applied to the device. An excessive thermal load can affect the device performance and, in extreme cases, can lead to a device shutdown. Existing devices can mitigate the thermal load by restricting which banks of the storage are used for all I/O operations, regardless of whether the I/O operations are for a batch process or a process supporting a user interface operation.

SUMMARY OF THE DESCRIPTION

A method and apparatus of a device that manages a thermal profile of a device by selectively throttling input/output operations of the device is described. In an exemplary embodiment, the device monitors the thermal profile of the device, where the device executes a plurality of processes that utilize storage of the device. In addition, the plurality of processes include a high priority process and a low priority process. If the thermal profile of the device exceeds a thermal threshold, the device decreases a first bandwidth range for the low priority process and maintains a second bandwidth range for the high priority process. The device further processes a storage request of the low priority process using the first bandwidth range and processing a storage request of the high priority process using the second bandwidth range.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
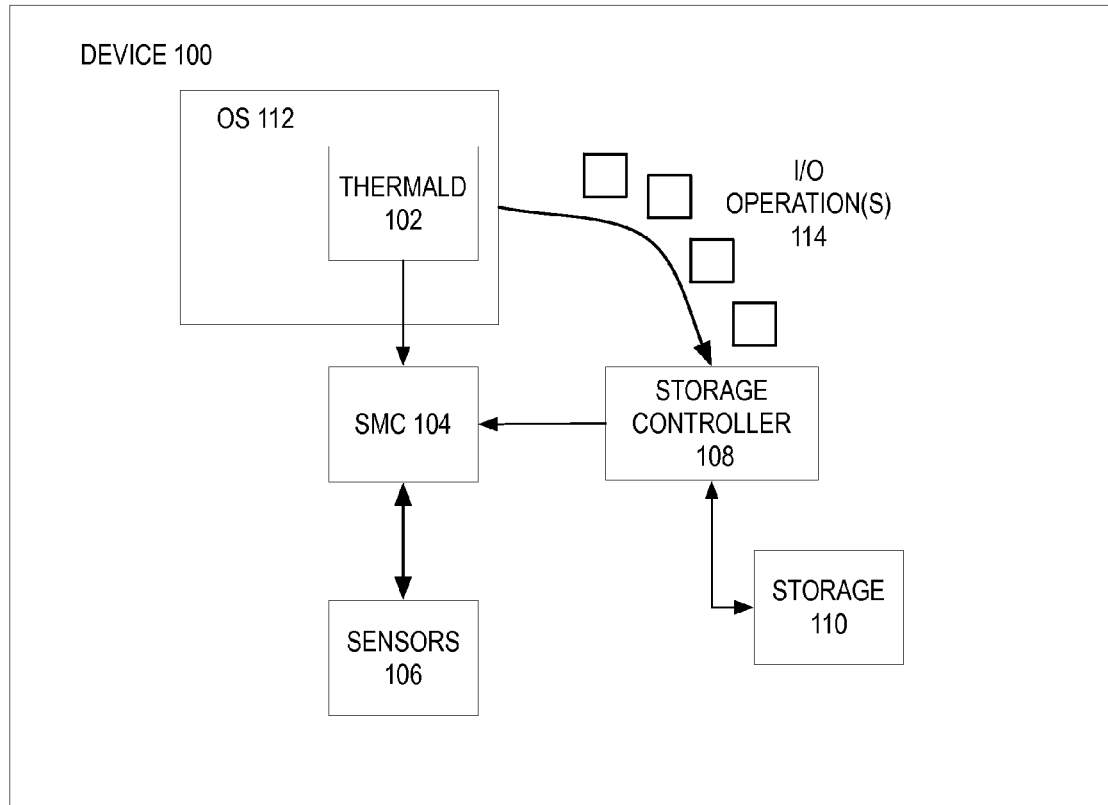
FIG. 1 is a block diagram of one embodiment of a device that mitigates a thermal profile of a device by selectively throttling input/output (I/O) operations of the device.

A method and apparatus of a device that manages a thermal profile of a device by selectively throttling input/output operations of the device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that manages a thermal profile of a device by selectively throttling input/output operations (I/O) of the device is described. In one embodiment, the device selectively throttles the I/O operations by restricting priority bandwidth ranges for one, some, or all of the I/O priorities, so that the overall I/O is reduced, but that I/O operations for higher priority process are not affected or are affected less than I/O operations for lower priority processes. In one embodiment, the device monitors the thermal data of the device. If the thermal data reaches or exceeds one or more thermal thresholds, the device selectively throttles the I/O operations for the different priorities. In this embodiment, each I/O operation has a priority. For example, an I/O operations associated with user interface operation would have a higher priority, whereas an I/O operation associated with a batch process (e.g., search indexing, backup, syncing), would have a lower priority. Alternatively, the I/O operation can get the priority based on the thread associated with the I/O operation. In one embodiment, a process or thread can issues I/O operations at differing I/O priorities, depending on the nature of the I/O operation. The device can include multiple I/O priorities. Each of the priorities has an associated bandwidth range. The bandwidth range is an allowable I/O bandwidth that each process can use during a particular time period. The device selectively throttles overall device I/O by restricting the bandwidth ranges for the different priorities based on the current thermal load on the device. For example and in one embodiment, if the device thermal load increases, the device can restrict the lowest or lower priority bandwidth ranges. This would decrease the I/O throughput for these lower priorities, but leave the I/O throughput for the higher priorities unchanged. As the thermal load on the device further increases, the device can either increase the I/O throttling of the lower priorities and/or start to throttle the higher priorities. In another embodiment, as the thermal load on the device lessens, the device can selectively relax the I/O throttling for the different priorities.

FIG. 1 is a block diagram of one embodiment of a device 100 that mitigates a thermal profile of a device by selectively throttling (I/O) operations of the device. In one embodiment, the device 100 can be a personal computer, laptop, server, mobile device (e.g., smartphone, laptop, personal digital assistant, music playing device, gaming device, etc.), network element (e.g., router, switch, gateway, etc.), and/or any device capable of executing multiple applications. In one embodiment, the device 100 can be a physical or virtual device. In FIG. 1, the device 100 includes an operating system 112, a system management controller 104, sensors 106, storage controller 108, and storage 110. In one embodiment, the operating system 112 is a set of software used to manage device hardware resources and provides common services for other running computer programs, such as application programs. In one embodiment, the system management controller 104 is a subsystem that controls the device power flow and fan speed. In this embodiment, the system management controller 104 couples to the operating system 112 and the sensors 106. In one embodiment, the sensors 106 are coupled to the system management controller 104 and include sensor(s) that monitor and record data regarding the thermal profile of the device 100. In this embodiment, the thermal profile is data about the thermal characteristic of the device 100. For example and in one embodiment, the thermal profile can include the device 100 temperature over time, device 100 module temperature over time (e.g., storage temperature, CPU die temperature, bottom case temperature of the device enclosure, fan speed, and/or other data related to the thermal characteristics of the device 100. In one embodiment, the sensors 106 are one or more sensors that measure the thermal characteristics of the device 100. For example and in one embodiment, the sensors 106 can include a sensor for the device temperature, sensor for the storage 112 and storage controller 110, and/or a fan speed sensor.

In one embodiment, the operating system 112 includes a thermal daemon, thermald 102. In this embodiment, thermald 102 is daemon that selectively throttles the input/output (I/O) operations of the device 100 in order to mitigate the thermal environment of the device 100. In one embodiment, thermald 102 receives the thermal data of the thermal profile and determines if the thermal data has crossed one of the thermal thresholds. In one embodiment, the device 100 can be configured for several different thermal thresholds, with each thermal threshold having a different I/O throttling level. In this embodiment, crossing a thermal threshold can mean that thermald 102 adjusts a set of priority bandwidth ranges that are used to selectively throttle I/O operations of the device 100. In this embodiment, the priority bandwidth ranges are used by the storage controller 108 to schedule each of the I/O operation according to the priority of that operation. Each I/O operation has an associated priority that indicates the relative importance of that I/O operation. I/O operations with a higher priority are more likely to be scheduled and processed than a lower priority. In one embodiment, there can be a plurality of different priorities (e.g., two or more different priorities). In one embodiment, under conditions of a low thermal load of the device 100, each of the priorities has the default priority bandwidth. As the thermal load on the device 100 increases, thermald 102 adjusts the priority bandwidths of one or more of the different priority bandwidth ranges. In one embodiment, a thermal load on the device can increase because the power consumption of the device or one or more components of the device (e.g., the storage controller 108 and storage device 110) increases.

In one embodiment, thermald 102 selectively decreases the priority bandwidth ranges for the lower priorities before decreasing the higher priority bandwidth ranges, so that lower priority I/O operations are throttled before the higher priority I/O operations. By selectively throttling the lower priority I/O operations, the higher priority I/O operations are not throttled, but the overall I/O throughput is decreased, thus decreasing the power consumption of the storage system for the device 100, decreasing the heat generated by the device, and reducing the thermal load on the device 100. If the thermal load on the device 100 continues to increase, thermald 102 can either further throttle the lower priority bandwidth ranges or start to throttle the higher priority bandwidth ranges. In one embodiment, thermald 102 throttles both the lower and higher priority bandwidth ranges. In another embodiment, as the thermal load of the device 100 decreases, thermald 102 lessens or removes the throttling of the lower and/or higher levels by relaxing the constraints placed on the different priority bandwidth ranges. In this embodiment, if the thermal load of the device 100 becomes low, thermald 102 restores the priority bandwidth ranges to normal. Managing the priority bandwidth ranges is further described in FIG. 4 below.

In one embodiment, the device 100 includes a storage controller 108 and storage 110. In one embodiment, the storage controller 108 is a set of hardware and associated circuitry or software for controlling the storage 110. In this embodiment, the storage controller 108 is coupled to the operating system 112. In one embodiment, the storage controller 108 receives priority bandwidths ranges from thermald 102. The storage controller 108 uses the priority bandwidth ranges to schedule and process the I/O operations 114. In one embodiment, the storage 112 is the media that is used to store data for the device. The storage can be a hard disk drive (HDD), solid state drive (SSD), flash, or other type of storage. In one embodiment, the I/O operation 114 is a type of I/O operation performed by the device for data stored or to be stored on the storage 112 (e.g., write, read, query, delete, create, and/or another type of storage operation).

Figure 2A:
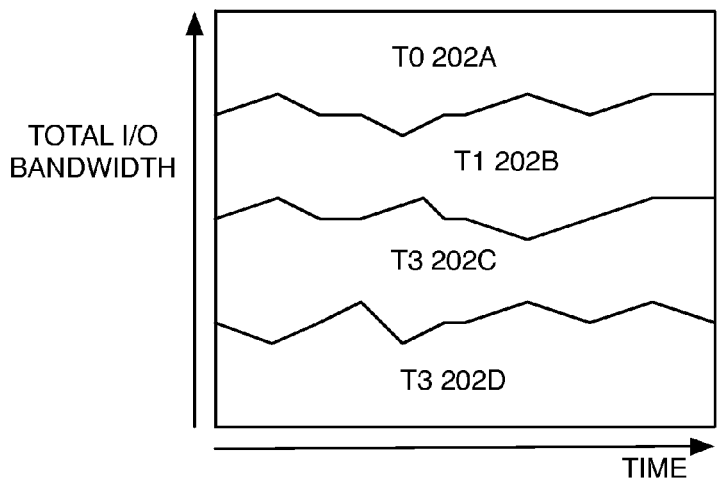
FIGS. 2A-C are illustrations of thermal bands for different levels of I/O throttling.
Figure 2B:
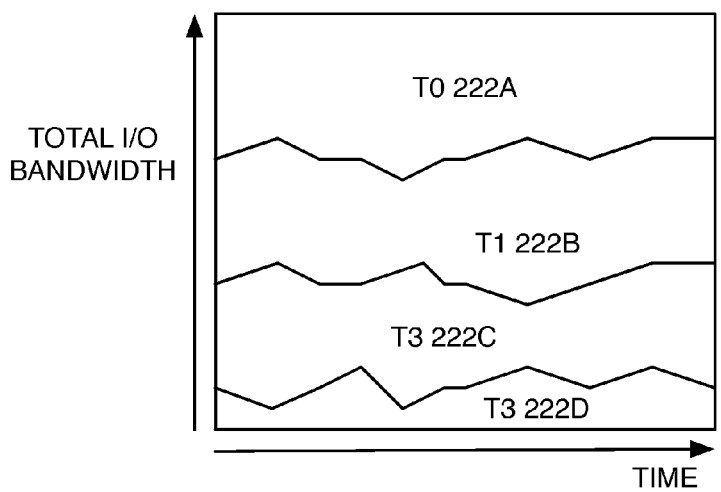
Figure 2C:
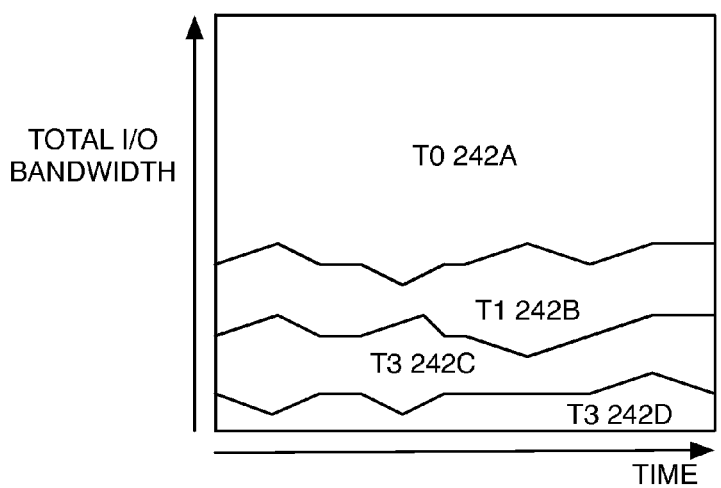

FIGS. 2A-C is an illustration of thermal bands for different levels of I/O throttling. FIG. 2A is an illustration of thermal bands 200A where there is no I/O throttling. In FIG. 2A, the thermal bands 202A-D are a measurement of the total available I/O bandwidth over time. In addition, thermal bands 202A-D illustrate how available bandwidth is distributed over time among the different tiers. In one embodiment, without thermal management throttling, the tiers compete equally with each other. As the thermal pressure increase, available bandwidth for low tiers is reduced. In one embodiment, the thermal bands 202A-D occupy roughly the same area. In other words, thermal band 202A, 202B, 202C, and 202D roughly occupy a similar area, over time, in the illustration. In one embodiment, thermal bands 202A-D correspond with priorities 0-3, respectively, where priority zero is the highest priority and priority three is the lowest priority. In one embodiment, FIG. 2A represents the thermal bands for a device under a low thermal load. Although FIG. 2A illustrates four thermal bands corresponding to four different priorities, in other embodiments, there can be more or less priorities or thermal bands.

In one embodiment, as the thermal load for the device increases, the thermal bands are adjusted so that higher priority thermal bands occupy more area. FIG. 2B illustrates thermal bands 200B where there is some I/O throttling for the lower priority processes. In FIG. 2B, thermal band 222A occupies a greater volume as compared with thermal band 222D. As in FIG. 2A above, thermal bands 222A-D correspond to priorities 0-3. In one embodiment, the lower priority thermal band 222D is adjusted downward. For example and in one embodiment, thermal band 222D is smaller and thermal bands 222A-C occupy larger area than thermal band 222D. In this embodiment, these thermal bands 200B corresponds to lower priority processes having greater I/O throttling than the higher priority processes. As the thermal load further increases, the lower priority processes can be further throttled and medium priority processes can be throttled as well. FIG. 2C illustrates thermal bands 200C where there is a greater amount of I/O throttling for the lower priority processes. In one embodiment, the thermal bands 242B-D are reduced, while thermal band 242A is increased. This corresponds to an embodiment where the higher priority process is not throttled and the lower priority processes corresponding to thermal bands 242B-D are throttled.

Figure 3:
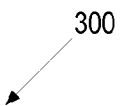
FIG. 3 is an illustration of a table of priority bandwidth percentages for different levels of I/O throttling.

FIG. 3 is an illustration of a table 300 of priority bandwidth ranges for different levels of I/O throttling. In FIG. 3, table 300 includes a column 302 of priorities and columns 304A-C of different priority bandwidth ranges for different throttling conditions. In one embodiment, priority 0 is the highest priority and priority N is the lowest priority. Three different I/O throttling conditions are illustrated in FIG. 3. In one embodiment, for the no I/O throttling condition 304A, each of the priority bandwidth ranges are from 0-100%. This condition represents a device with little or no thermal load. In this embodiment, each of the processes will have their I/O scheduled and processed normally and with no I/O throttling. As the thermal load for the device increases, the device starts to throttle the lower priority processes. In one embodiment, this is illustrated by column 304B where there is some I/O throttling for the lower priority processes. For example in one embodiment, priorities 0 and 1 have a priority bandwidth range of 0-100%. Priority 2 has a priority bandwidth range of 0-80% and priority N has a priority bandwidth range of 0-50%. This illustrates the lower priority processes getting potentially throttled by 20-50%. As the thermal load further increases, each of the priorities will have their I/O throttled. For example in one embodiment, in column 304C, priority zero has a priority bandwidth range of 0-90%, priority one has a priority bandwidth range of 0-80%, priority two has a priority bandwidth range of 0-50%, and party and has a priority bandwidth range of 0-25%.

Figure 4:
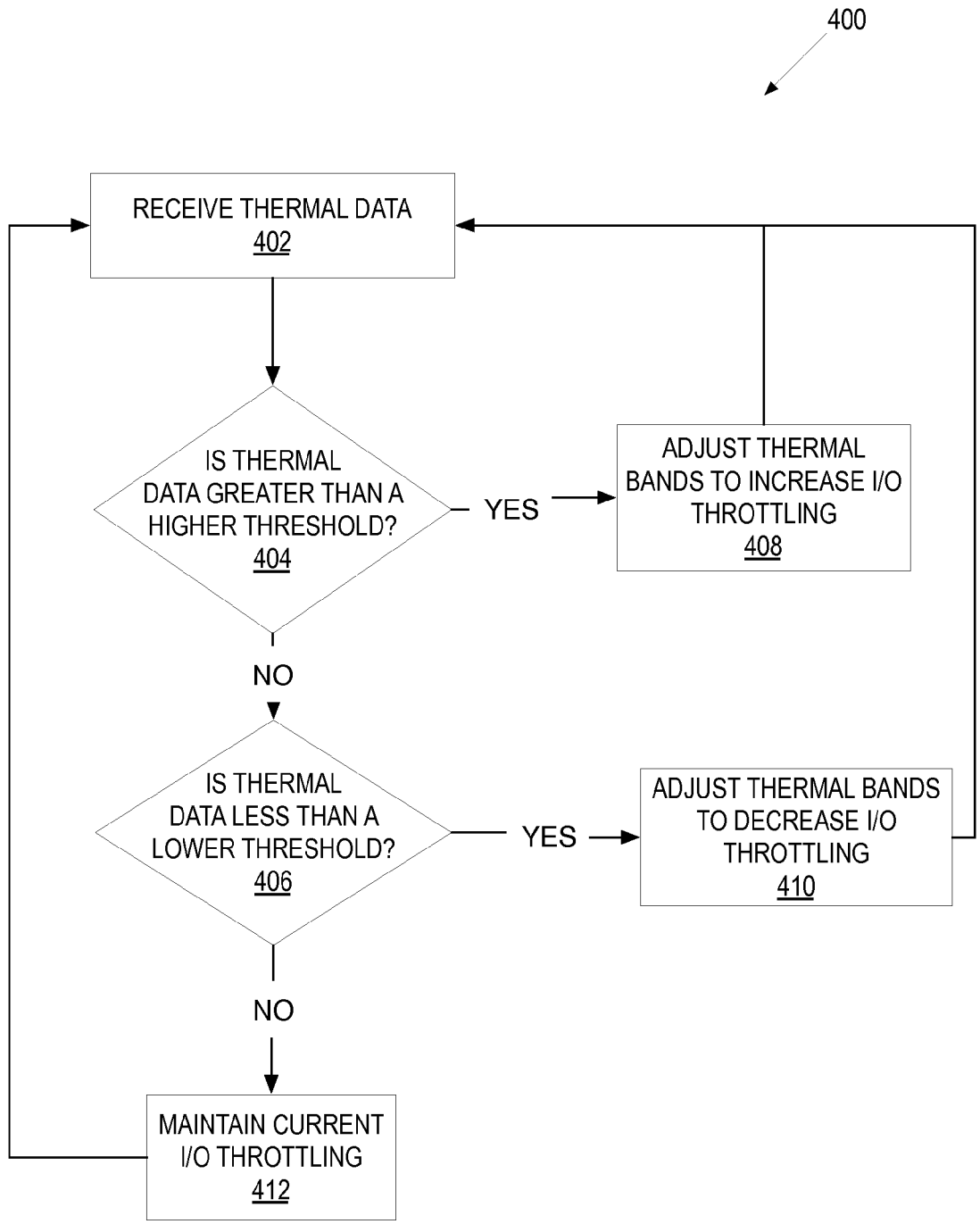
FIG. 4 is a flow diagram of one embodiment of a process to manage I/O throttling based on the thermal data of the device.

FIG. 4 is a flow diagram of one embodiment of a process 400 to manage I/O throttling based on the thermal data of the device. In one embodiment, process 400 is performed by a thermal daemon to manage I/O throttling, such as thermald 112 as described above in FIG. 1. In FIG. 4, process 400 begins by receiving the thermal data at block 402. In one embodiment, the thermal data is the data related to the thermal profile or other thermal characteristics of the device. For example in one embodiment, the thermal data can be time-dependent thermal data regarding the device temperature, temperature of a particular module of the device, data regarding fan use, and/or other data related to the thermal characteristics of the device. At block 404, process 400 determines if the thermal data is greater than a higher threshold. In one embodiment, the higher threshold is a threshold that indicates that the device can have greater I/O throttling so as to mitigate the thermal load that is on the device. For example and in one embodiment, the thermal threshold can be related to the temperature of the device, a module of the device, fan speed, or some other thermal characteristic. As another example and embodiment, a set of higher thermal threshold could be used if the device temperature exceeded 40° C., 45° C., 50° C., etc. In another embodiment, the thermal threshold can be based on time of day or user activity. For example and in one embodiment, if process 400 knows that a user is very likely to use the machine in near future (e.g., say back from lunch), process 400 may choose to throttle low I/O tiers to leave "thermal headroom" for the task(s) users are likely to perform. This embodiment can be useful for devices that do not have fans to actively dissipate heat. If the thermal data is greater than a higher threshold, process 400 adjusts the thermal bands to increase the I/O throttling at block 408. In one embodiment, process 400 adjusts the thermal bands by throttling one or more of the different I/O priorities. In this embodiment, process 400 can start to throttle a priority or further throttle an already throttled priority level. In one embodiment, process 400 throttles a priority by restricting the priority bandwidth range for I/O operations of that priority. For example in one embodiment, process 400 can throttle a priority by restricting a 0-100% priority bandwidth range to 0-80% as described in FIG. 3 above. Alternatively, process 400 can throttle a priority that is restricted from 0-50% down to 0-25%. By throttling a priority bandwidth range for different priorities, process 400 selectively throttles the different priorities, thus allowing greater bandwidth range for higher priorities and lower bandwidth range for lower priorities. This allows for less power consumption of the storage subsystem for the advice, while having better I/O throughput for higher priority processes at the expense of I/O throughput for lower priority processes. A lower power consumption of the storage system can help mitigate the thermal load on the device.

If the thermal data is not greater than a higher threshold, process 400 determines if the thermal data is less than a lower threshold at block 406. In one embodiment, if the thermal data is less than a lower threshold, process 400 may want to relax the I/O throttling as the thermal load on the device may be lessening. For example and in one embodiment, if the current throttling is for a device with a temperature of 40-45° C. and the temperature falls to below 40° C., which is a low thermal load for the device, process 400 may relax the current I/O throttling. If the thermal data is less than a lower threshold, at block 410, process 400 can adjust the thermal bands to decrease the I/O throttling. In one embodiment, process 400 relaxes the restrictions placed on the I/O throughput for one or more of the different priorities. For example and in one embodiment, process 400 can relax a priority with a 0-80% priority bandwidth range back to an unrestricted 0-100% bandwidth range as described in FIG. 3 above. Alternatively, process 400 can relax a restricted priority at a 0-25% to a less restricted 0-50% bandwidth range. If the thermal data is not less than the lower threshold, process 400 maintains the current I/O throttling at block 412. Execution proceeds to block 412 above.

Figure 5:
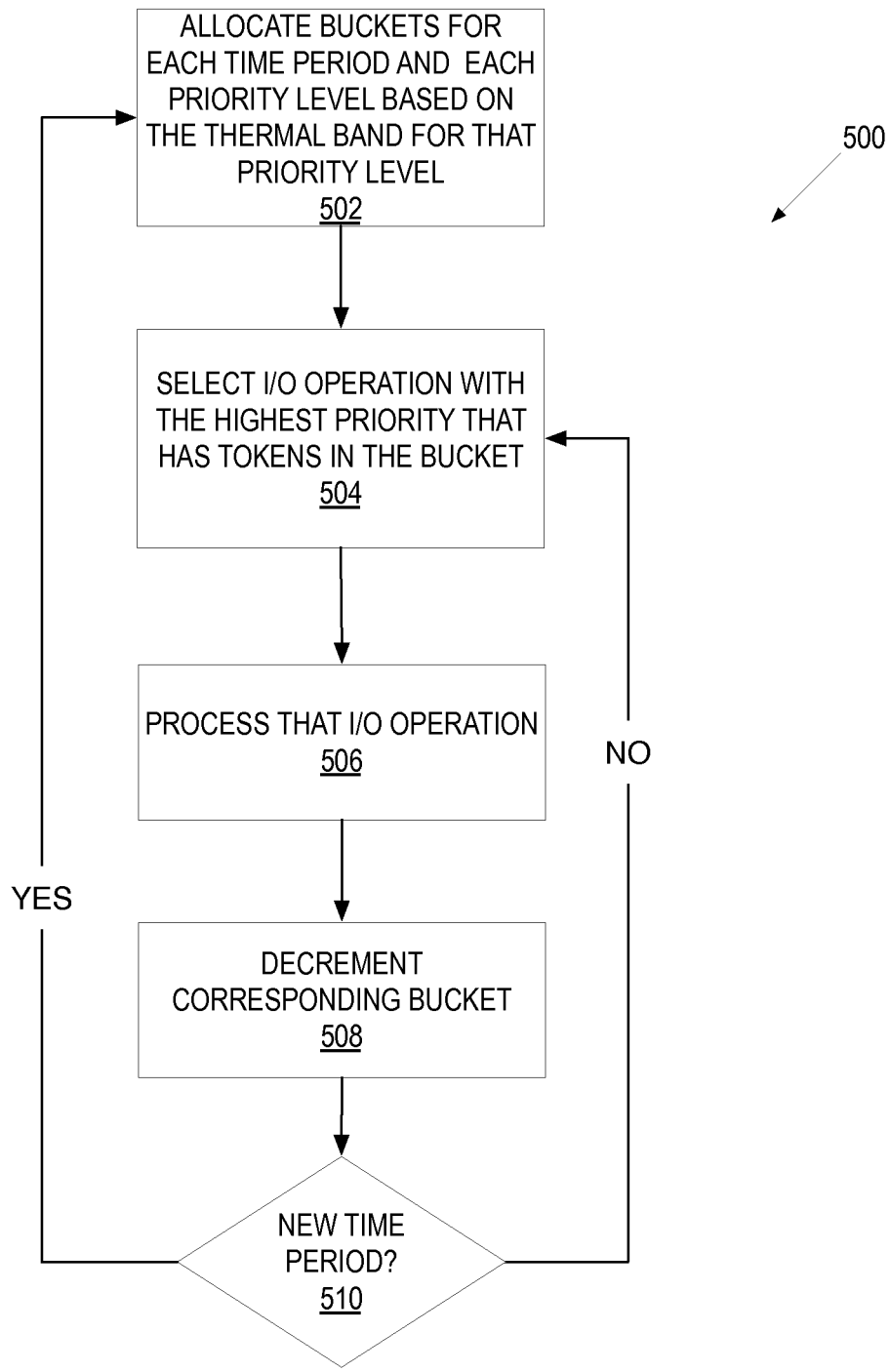
FIG. 5 is a flow diagram of one embodiment of a process to processing I/O operations.

As described above, the device can selectively restrict and relax different priority bandwidth ranges in response to the thermal data of the device. The device uses the different priority bandwidth ranges to process the device I/O operations. FIG. 5 is a flow diagram of one embodiment of a process to process I/O operations. In one embodiment, process 500 is performed by a storage controller to process I/O operations using the priority bandwidth ranges, such as storage controller 108 as described in FIG. 1 above. In FIG. 5, process 500 begins by allocating buckets for each time period and each priority based on the thermal band for that priority at block 502. In one embodiment, a priority bucket is used to enforce the priority bandwidth range for that priority. In this embodiment, each bucket would have a certain number of tokens that are used to allocate the number of I/O operations that can be processed for that priority and for that time period. Priorities with a restricted bandwidth range will have fewer tokens than priorities with an unrestricted bandwidth range. For example in one embodiment, a priority with a 0-100% bandwidth range can have twice as many tokens in its bucket than a priority with a 0-50% bandwidth range. If the bucket runs out of tokens in a time period, then no more I/O operations for the priority will be processed during that time period. In one embodiment, process 500 makes sure that there is a minimum bandwidth available priority, such that a low priority is not starved of I/O bandwidth. At block 504, process 500 selects an I/O operation with the highest priority that has tokens in the bucket. Process 500 processes that I/O operation at block 506 and decrements the corresponding bucket for that priority at block 508. At block 510, process 500 determines if there is a new time period. If there is a new time period, execution proceeds to block 502 above. If there is not a new time period, execution proceeds to block 504 above.

Figure 6:
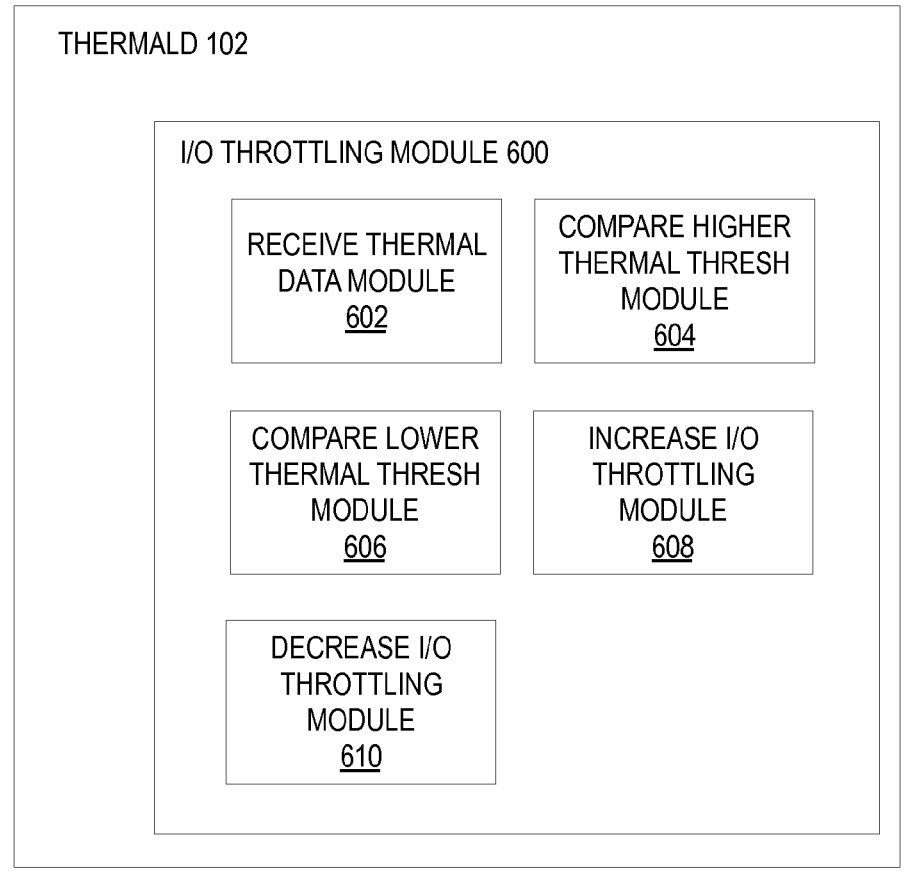
FIG. 6 is a block diagram of one embodiment of a thermal daemon that manages I/O throttling based on the thermal data of the device.

FIG. 6 is a block diagram of one embodiment of a thermal daemon, thermald, 102 that manages I/O throttling based on the thermal data of the device. In one embodiment, thermald 102 includes an I/O throttling module 600 that determines whether to selectively apply or relax an I/O throttle to a priority. In one embodiment, the I/O throttling module 600 includes a receive thermal data module 602, compare higher thermal threshold module 604, compare lower thermal threshold module 606, increase I/O throttling module 608, and decrease I/O throttling module 610. In one embodiment, the receive thermal data module 602 receives the thermal data as described in FIG. 4, block 406 above. The compare higher thermal threshold module 604 compares the thermal data with a higher threshold as described in FIG. 4, block 404 above. The compare lower thermal threshold module 606 compares the thermal data with a lower threshold as described in FIG. 4, block 402 above. The increase I/O throttling module 608 increases the I/O throttling for one or more priorities as described in FIG. 4, block 408 above. The decrease I/O throttling module 610 decreases the I/O throttling for one or more priorities as described in FIG. 4, block 410 above.

Figure 7:
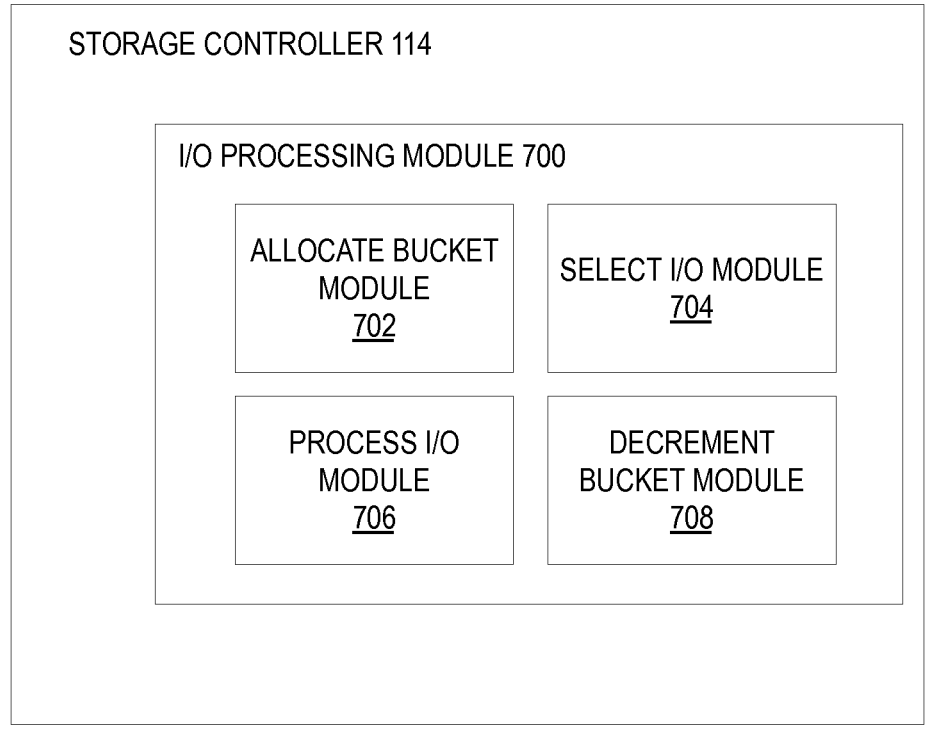
FIG. 7 is a block diagram of one embodiment of a storage controller that processes I/O operations.

FIG. 7 is a block diagram of one embodiment of a storage controller 108 that processes I/O operations. In one embodiment, the storage controller 108 includes an I/O processing module 700 that processes I/O operations using buckets allocated based on the priority bandwidth range. In one embodiment, the I/O processing module 700 includes allocate bucket module 702, select I/O module 704, process I/O module 706, and decrement bucket module 708. In one embodiment, the allocate bucket module 702 allocates buckets for each priority as described in FIG. 5, block 502 above. The select I/O module 704 selects an I/O operation from the highest priority bucket as described in FIG. 5, block 504 above. The process I/O module 706 processes the selected I/O operation as described in FIG. 5, block 506 above. The decrement bucket module 708 decrements the corresponding bucket as described in FIG. 5, block 508 above.

Figure 8:
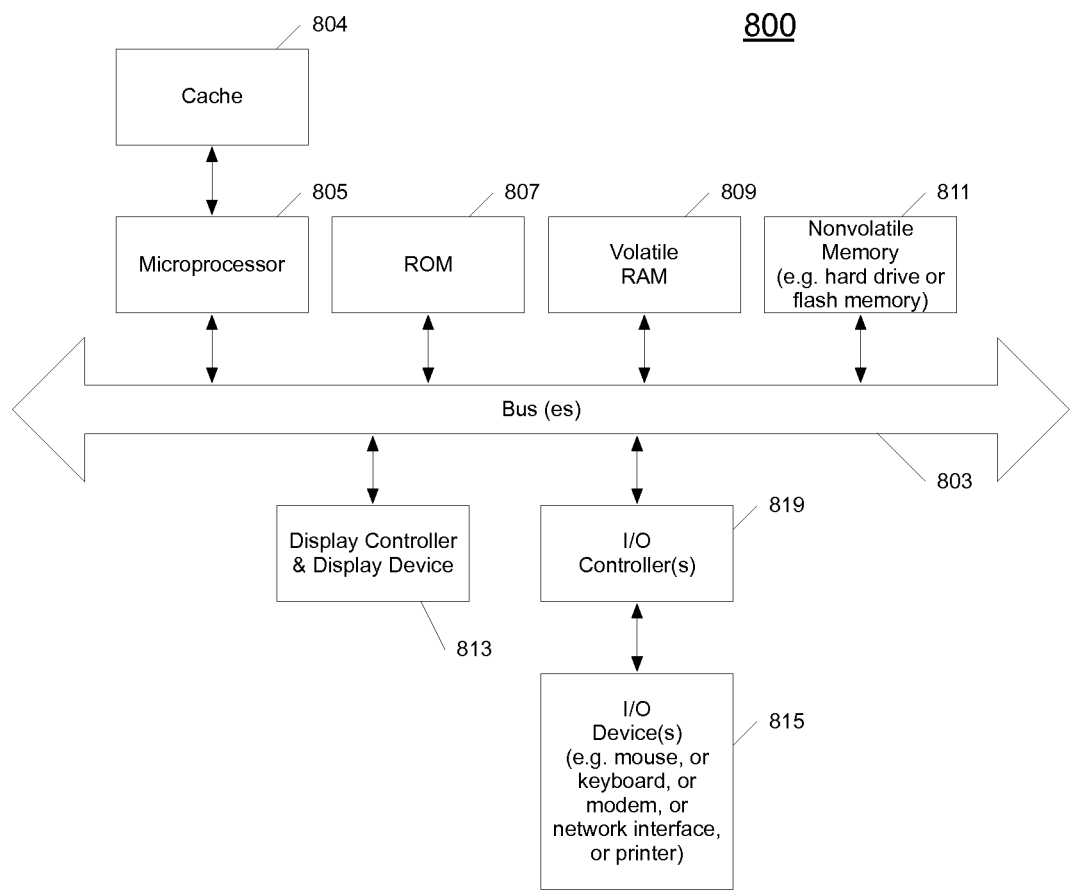
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented including a device 100 as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 88 and to peripheral devices such as input/output (I/O) devices which may be mice, keyboards, modems, network interfaces, printers and other devices which are well known in the art. Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM or a flash memory or other types of memory systems, which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
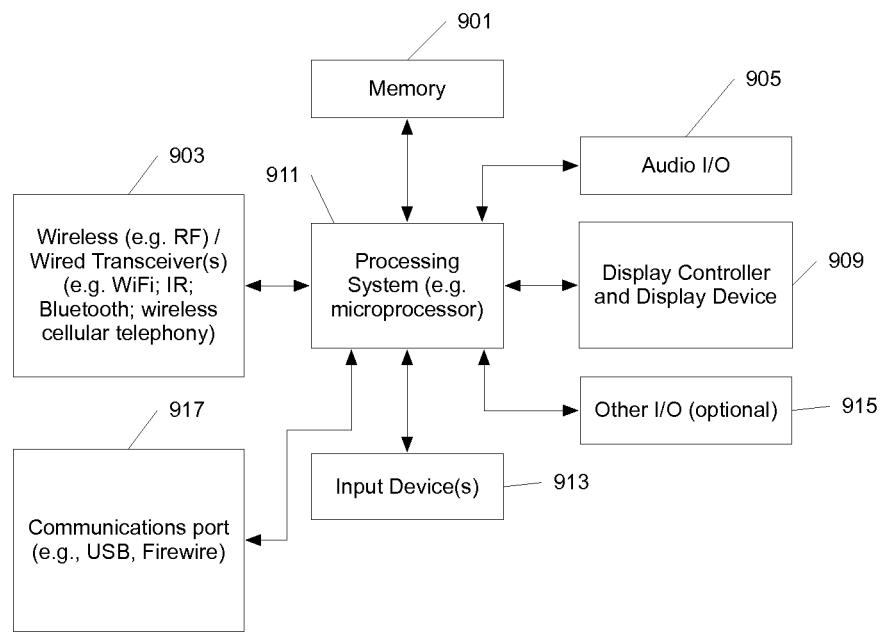
FIG. 9 shows an example of a data processing system, which may be used with one embodiment of the present invention.

FIG. 9 shows an example of another data processing system 900 which may be used with one embodiment of the present invention. For example, system 900 may be implemented as a device 100 as shown in FIG. 1. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905, which may include a microphone and a speaker for, for example, playing back music or providing telephone functionality through the speaker and microphone.

A display controller and display device 909 provide a visual user interface for the user; this digital interface may include a graphical user interface which is similar to that shown on a Macintosh computer when running OS X operating system software, or Apple iPhone when running the iOS operating system, etc. The system 900 also includes one or more wireless transceivers 903 to communicate with another data processing system, such as the system 900 of FIG. 9. A wireless transceiver may be a WLAN transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further includes one or more communications ports 917 to communicate with another data processing system, such as the system 800 of FIG. 8. The communications port may be a USB port, Firewire port, Bluetooth interface, etc.

The data processing system 900 also includes one or more input devices 913, which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems, which have fewer components or perhaps more components than that shown in FIG. 9.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "decreasing," "increasing," "processing," "computing," "recording," "restoring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to manage a thermal profile of a device, the method comprising:
    monitoring the thermal profile of the device, wherein the device is executing a plurality of input/output operations that utilize storage of the device, the plurality of input/output operations including a first priority input/output operation and a second priority input/output operation;
    determining that the thermal profile of the device exceeds a first thermal threshold,
        decreasing a first bandwidth range for the first input/output operation to less than 100%, and
        decreasing a second bandwidth range for the second input/output operation to less than 100% and the second bandwidth range is greater than the first bandwidth range, wherein the thermal profile is selected from the group consisting of device temperature and audible fan noise;
    processing a storage request of the first priority input/output operation using the first bandwidth range;
    processing a storage request of the second priority input/output operation using the second bandwidth range; and
    determining that the thermal profile falls below the first thermal threshold,
        restoring the first and second bandwidth range to previous values.

2. The non-transitory machine-readable medium of claim 1, wherein a bandwidth range sets an amount of available storage bandwidth that is made is available for an input/output operation.

3. The non-transitory machine-readable medium of claim 1, determining that the thermal profile of the device exceeds a second thermal threshold,
    further decreasing the first and second bandwidth ranges, wherein the second bandwidth range is greater than the first bandwidth range.

4. The non-transitory machine-readable medium of claim 1, if the thermal profile falls below the second thermal threshold,
    restoring the first and second bandwidth range to previous values.

5. The non-transitory machine-readable medium of claim 1, wherein the high priority input/output operation is associated with a visual process and the low priority input/output operation is associated with a batch process.

6. The non-transitory machine-readable medium of claim 1, wherein the monitoring of the thermal profile comprises:
    recording the device temperature.

7. The non-transitory machine-readable medium of claim 1, further comprising:
    maintaining a third bandwidth range; and
    processing a storage request for a third priority input/output operation using the third bandwidth range.

8. The non-transitory machine-readable medium of claim 1, wherein the first bandwidth range is allocated a first set of tokens and the second bandwidth range is allocated a second set of tokens.

9. The non-transitory machine-readable medium of claim 8, further comprising:
    processing an input/output operation corresponding to one of the first and second bandwidth ranges if that bandwidth range has an available token from a set of tokens corresponding to that the one of the first and second bandwidth ranges; and
    decrementing a token from the corresponding bandwidth range.

10. A method to manage a thermal profile of a device, the method comprising:
    monitoring the thermal profile of the device, wherein the device is executing a plurality of input/output operations that utilize storage of the device, the plurality of input/output operations including a first priority input/output operation and a second priority input/output operation;

determining that the thermal profile of the device exceeds a first thermal threshold, decreasing a first bandwidth range for the first input/output operation to less than 100%, and decreasing a second bandwidth range for the second input/output operation to less than 100% and the second bandwidth range is greater than the first bandwidth range, wherein the thermal profile is selected from the group consisting of device temperature and audible fan noise;

processing a storage request of the first priority input/output operation using the first bandwidth range;

processing a storage request of the second priority input/output operation using the second bandwidth range; and determining that the thermal profile falls below the first thermal threshold, restoring the first and second bandwidth range to previous values.

11. The method of claim 10, wherein a bandwidth range sets an amount of available storage bandwidth that is made is available for an input/output operation.

12. The method of claim 10, determining the thermal profile of the device exceeds a second thermal threshold, further decreasing the first and second bandwidth ranges, wherein the second bandwidth range is greater than the first bandwidth range.

13. The method of claim 12, if the thermal profile falls below the second thermal threshold, restoring the first and second bandwidth range to previous values.

14. A device to manage a thermal profile of a device, the device comprising:

a processor;

a memory coupled to the processor though a bus; and a process executed from the memory by the processor that causes the processor to monitor the thermal profile of the device, wherein the device is executing a plurality of input/output operations that utilize storage of the device, the plurality of input/output operations including a first priority input/output operation and a second priority input/output operation, determine the thermal profile of the device exceeds a first thermal threshold, the processor to decrease a first bandwidth range for the first input/output operation to less than 100%, and decrease a second bandwidth range for the second input/output operation to less than 100% and the second bandwidth range is greater than the first bandwidth range, the processor further to process a storage request of the first priority input/output operation using the first bandwidth range, process a storage request of the second priority input/output operation using the second bandwidth range and determine that the thermal profile falls below the first thermal threshold, the processor further to restore the first and second bandwidth range to previous values, wherein the thermal profile is selected from the group consisting of device temperature and audible fan noise.

15. The device of claim 14, wherein a bandwidth range sets an amount of available storage bandwidth that is made is available for an input/output operation.

* * * * *